United States Patent [19]
Varney

[11] 3,788,453
[45] Jan. 29, 1974

[54] INCLINED CONVEYOR FOR HANDLING FRAGILE ARTICLES

[75] Inventor: Robert E. Varney, Lakeland, Fla.

[73] Assignee: FMC Corporation, San Jose, Calif.

[22] Filed: Sept. 1, 1972

[21] Appl. No.: 285,712

[52] U.S. Cl. .............................. 198/153, 226/14
[51] Int. Cl. ............................................. B65g 17/04
[58] Field of Search .......... 198/153, 154, 1; 226/14

[56] References Cited
UNITED STATES PATENTS
2,035,227   3/1936   Fowler .................................. 226/14

Primary Examiner—Richard E. Aegerter
Assistant Examiner—Joseph E. Valenza
Attorney, Agent, or Firm—F. W. Anderson et al.

[57] ABSTRACT

An inclined conveyor for elevating or lowering relatively fragile articles, such as whole peeled grapefruit, includes an endless flexible draper belt which is mounted for rotation in an inclined plane. The upper run of the draper belt is arranged to be engaged at spaced locations by a series of transversely extending rods which are moved in an endless loop path within the endless loop path of the draper belt. The linear speed of the rods is less than that of the draper belt and the upper run of the draper belt has end portions which extend in generally horizontal planes at the upstream and downstream ends of the endless loop path of the rods whereby a pendant pocket is caused to be gradually formed in the draper belt between each pair of adjacent rods which pocket is then elevated or lowered solely by means of the movement of the rods; thus, the fragile articles can be continuously supported by the belt while they are transferred to a different elevation without being unduly jostled or otherwise disturbed so as to cause damage thereto.

14 Claims, 9 Drawing Figures

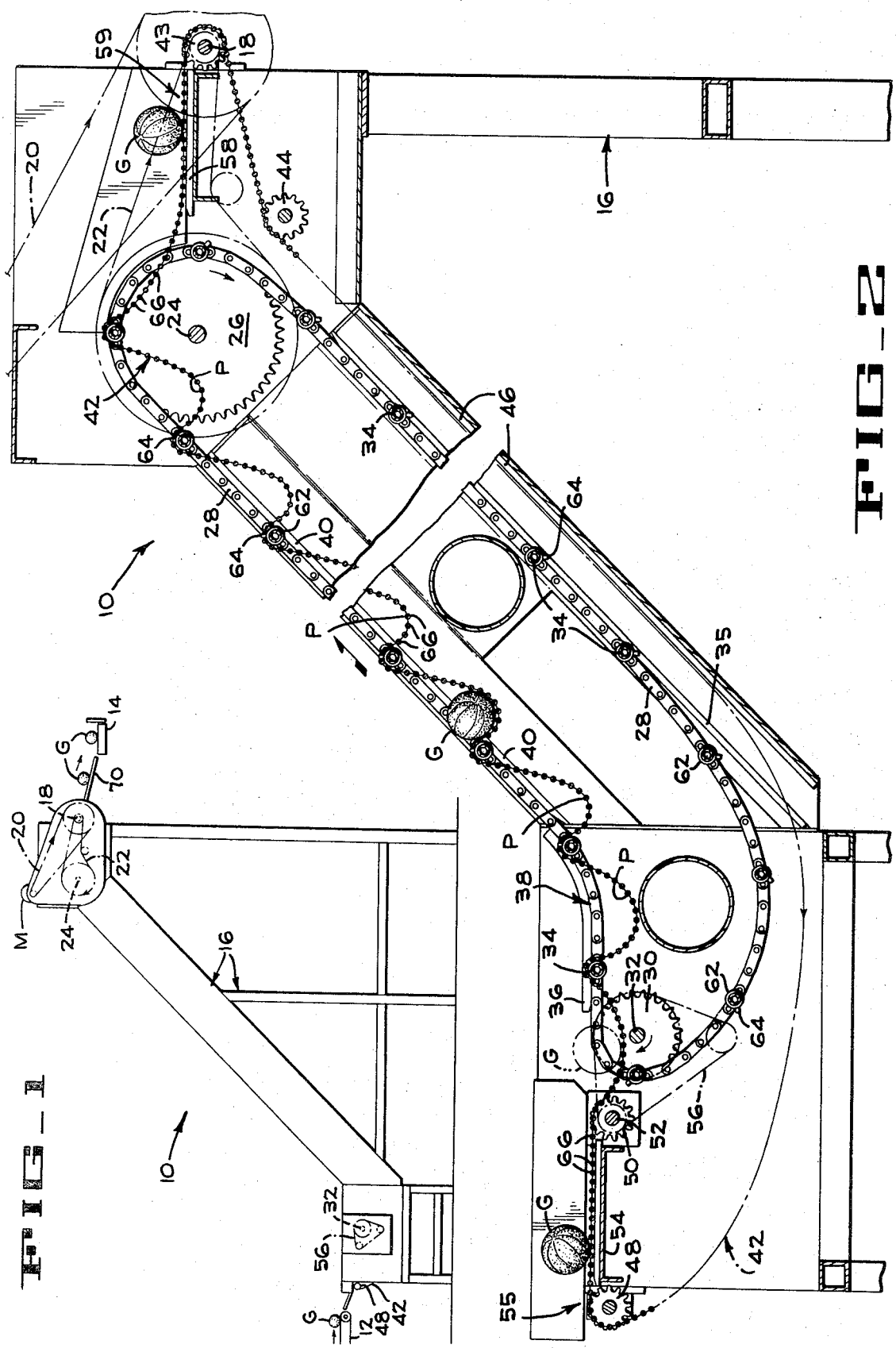

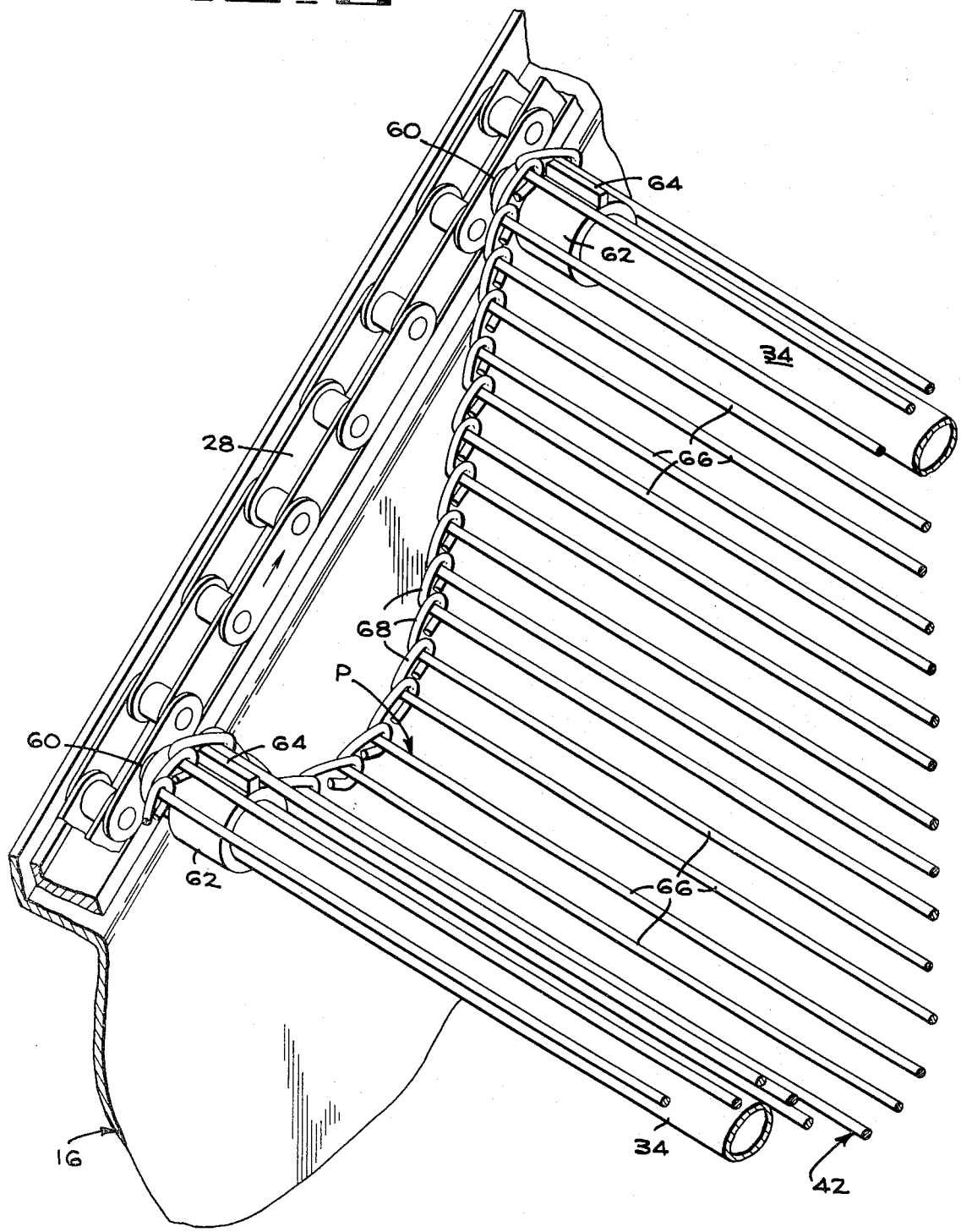

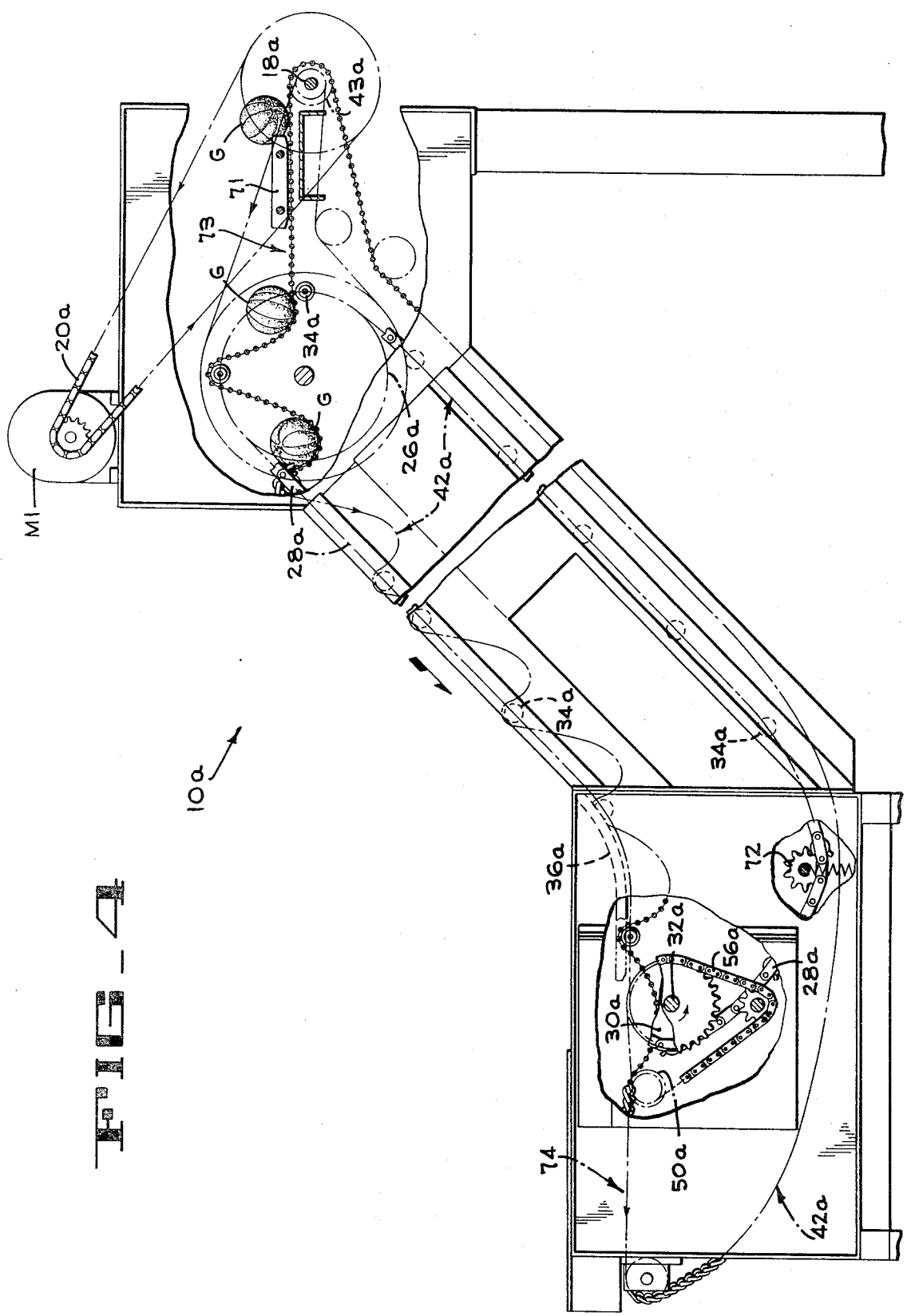

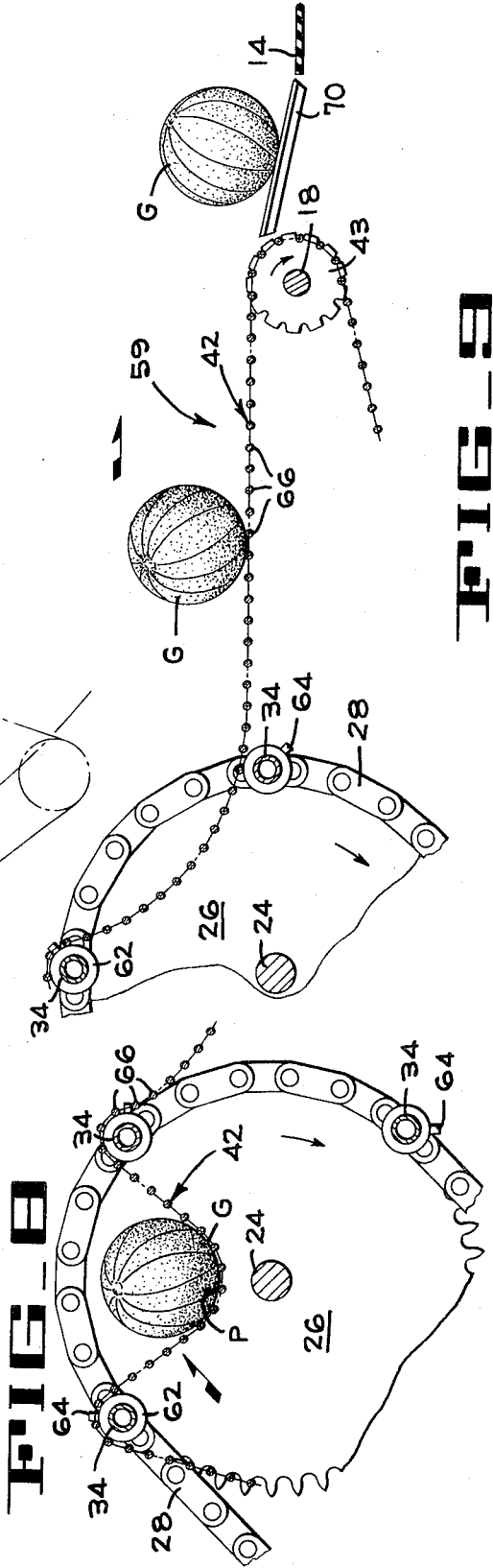
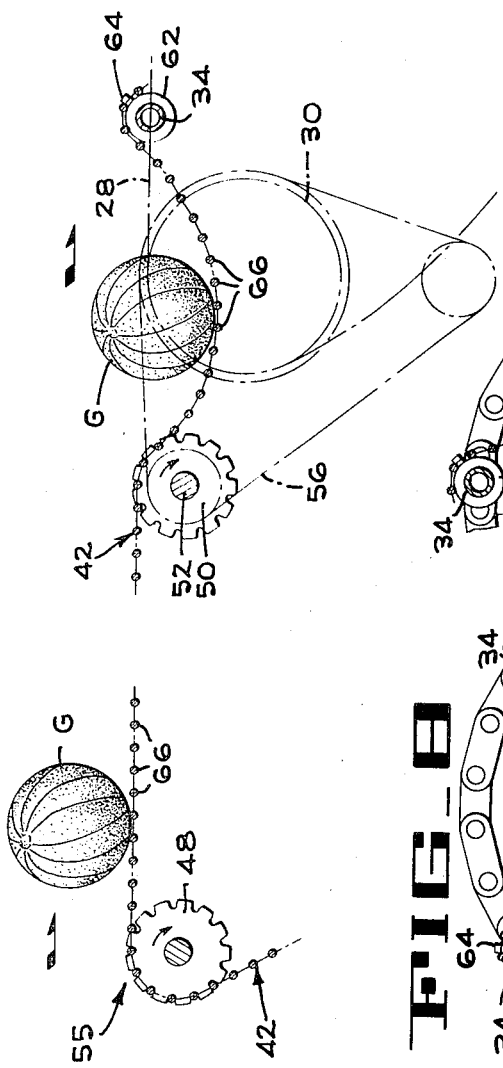
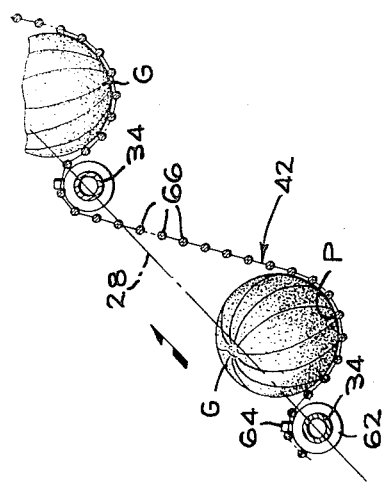

INCLINED CONVEYOR FOR HANDLING FRAGILE ARTICLES

BACKGROUND OF THE INVENTION

The field of the present invention concerns conveyors for handling fragile articles. More specifically, the present invention is directed to an inclined conveyor for elevating or lowering fragile articles such as whole peeled grapefruit without rupturing the relatively fragile cells of such fruit.

Elevators and lowerators for the gentle handling of fragile articles such as fruit and vegetable products have been extensively developed in the prior art. Many of such devices are now specifically adapted to the handling of only certain types of produce articles, such as whole uncooked tomatoes or whole cooked and peeled tomatoes, since produce of different species or in various stages of processing require different handling techniques. One such fragile produce product is peeled grapefruit which, in either whole or segment form, requires very gentle transport to prevent rupture of the relatively fragile juice cells. For this reason, an efficient method of elevating or lowering peeled grapefruit at relatively high production rates necessarily requires that the fruit not be abraded by being dropped into or from conveying pockets or the like.

At present, fragile articles such as whole peeled grapefruit are sometimes elevated or lowered during transfer between processing stations by a conveyor belt. Due to the nearly spherical shape of the fruit, the pitch of the conveyor belt must be very slight in order to prevent the fruit from rolling. Accordingly, if the fruit must remain on a single belt flight, any substantial difference in elevation between processing stations requires both a long conveyor belt and a substantial spacing between stations. Transferring the fruit to follow a zig zag path between oppositely directed belt flights can reduce the spacing between processing stations, but this arrangement increases the possibility—even the probability—of damage to the fragile, exposed and vulnerable juice cells of the fruit.

One type of prior art conveying system for elevating fragile articles such as fruit and vegetables is disclosed in the U.S. Pat. No. 3,241,582, to Belk. The conveying portion of the patented system comprises a pair of driven chains with a serpentine belt secured to the chains to provide pockets for carrying the produce on an upwardly moving inclined conveying flight. The pockets retain a fixed form and merely invert as they move with the chain on their return flight. If this type of conveyor is fed from a conveying belt or chute, the product must drop some distance into the pockets, and, in the case of peeled grapefruit, damage to the product will likely result.

Another prior art inclined conveying system, for ripe tomatoes, is disclosed in the U.S. Pat. No. 3,200,559, to Curtis. This system has the same general disadvantages as the system above described when handling fragile products.

SUMMARY OF THE INVENTION

Even though the above-identified patented devices can handle some types of relatively fragile fruit or other fragile articles, for the present purpose they are inherently deficient because the articles must be dropped during the feeding and/or discharge operations. Accordingly, it is a general object of the present invention to provide an article transfer mechanism, in particular an inclined conveyor, which, in the feeding and discharging operations, does not impact the articles or otherwise jostle the articles so as to cause damages thereto. A more specific object is to provide an inclined conveyor which maintains support of the elevated or lowered articles without relative movement between the articles and the article support at any time during the feeding, conveying and discharging operations. A further object is to provide an inclined conveyor according to the preceding objects which can be adapted to either elevate or lower very fragile articles such as whole peeled grapefruit.

One aspect of the present invention is the provision of a conveyor including an inclined flight of spaced rods and a superposed length of flexible draper belt which is formed into pendant pockets between adjacent rods by feeding an inlet portion of the draper belt to intersect the path of the rods at a linear velocity higher than the linear velocity of the rods. In this way, one portion of the draper belt is suspended from one rod, and the succeeding belt portion is gradually formed into a U-shaped loop by the time the next rod engages the belt. Thus, fruit or other fragile articles, which are initially conveyed by a planar inlet portion of the draper belt, will be continuously supported in relatively stable positions as the draper belt is formed into pockets to hold the articles as they are raised or lowered. At the outlet portion of the draper belt the operation is essentially reversed, and the draper belt reassumes its planar form to cause the pockets to gradually flatten and disappear. The fragile articles are thus continuously supported and never impacted in any way between the feeding and discharging operations.

In summary, the general inventive concept of the present invention is the provision of a flexible conveying surface for elevating or lowering fragile articles that: (1) supports and conveys the fragile articles in a substantially horizontal plane, (2) is formed into a series of pockets to support the articles without unduly disturbing them, (3) conveys the articles to another elevation, and (4) is straightened, or restored to substantially planar condition, to support the articles in a manner wherein they can be gently discharged.

BRIEF DESCRIPTION OF THE DRAWINGS

FIG. 1 is a diagrammatic side elevation of a fruit elevator incorporating the present invention.

FIG. 2 is an enlarged diagrammatic longitudinal section through the first elevator shown in FIG. 1.

FIG. 3 is an enlarged schematic perspective of a segment of the upper conveying flight of the FIG. 2 apparatus.

FIG. 4 is a diagrammatic elevation of a second embodiment of the invention, a lowerator similar in structure to the FIG. 2 elevator.

FIGS. 5–9 are fragmentary, schematic enlarged portions of the apparatus shown in FIG. 2 and illustrate successive operational conditions for one conveying pocket carrying a whole, peeled grapefruit.

DESCRIPTION OF THE PREFERRED EMBODIMENT

As diagrammatically illustrated in FIG. 1, the present invention is incorporated into a fruit elevator 10 for transferring whole peeled grapefruit G from one processing machine or station to another, here shown, respectively, as a delivery conveyor 12 and an elevated discharge conveyor 14. In order to insure that the fruit is unbruised, unruptured and in no manner marked or damaged, the elevator 10 functions with a unique operating mode which produces little or no relative movement between the fruit and the conveying surface of the elevator and is effective to receive, transfer and discharge the fruit without impacts.

Rotatably supported by a fabricated, floor-supported frame assembly 16 is a jackshaft 18, which is coupled to a motor M by a chain and sprocket drive train 20. A second chain and sprocket drive train 22 connects the jackshaft 18 to a driveshaft 24 which extends across the frame of the elevator 10 and provides driving power to two laterally spaced drive sprockets 26, only one of which is shown in FIG. 2. Each of the two drive sprockets 26 receives one end of an endless drive chain 28, which is oriented in a generally inclined plane, as best seen in FIG. 2. The lower end of each drive chain 28 is trained around a sprocket 30 carried on a common shaft 32 that, in operation, is driven by the drive chains 28. A plurality of uniformly spaced transverse lift rods 34 extend between and are carried by the drive chains 28. The lower runs of the drive chains 28 are received upon and supported by inclined guides 35.

It will be noted that the lower flights of the drive chains 28 are somewhat slack between lower flight chain guides 35 and the driven sprockets 30 (FIG. 2), and then they are passed over the sprockets and under curved, fixed guide rails 36 to form a shallow arc at 38 (FIG. 2). Beyond the curved guide rails 36, the drive chains 28 extend linearly upward to the drive sprockets 26 and are supported by fixed guides 40. Since the drive sprockets 26 move the upper flight of the drive chains 28 upward, this flight is maintained taut regardless of the slackness in other portions of the drive chains, and the timing relationship of the driven sprockets 30 to the jackshaft 18 remains constant.

An endless, flexible draper chain or belt 42 extends around the loop of the drive chains 28, around a pair of sprockets 43 on the jackshaft 18 at the upper end of the elevator 10, and over adjacent idler sprockets 44 (only one of which is shown in FIG. 2). A flat inclined guide plate 46 supports the lower flight of the draper belt which extends from the guide plate over inlet end idler sprockets 48 and adjacent drive sprockets 50 that are fixed on a driven shaft 52. Between the sprockets 48 and 50, support rails 54 maintain the inlet end 55 of the draper belt in a horizontal planar condition. Power for the lower drive sprockets 50 is provided by means of a chain and sprocket drive connection 56 between the shafts 32 and 52. The shaft 32 is powered by the drive sprockets 30 when the drive chains 28 are in motion, and thus continuous driving power is provided for the draper belt. It will be noted (from FIG. 2) that the linear speed of the draper belt will be greater than that of the drive chains since the sprocket 50 engaged with the draper belt is smaller than the sprocket 30 in engagement with the drive chains 28. At the outlet, or upper, end of the elevator 10, support rails 58, which are located between the drive sprockets 26 and 43 for the drive chains and draper belt respectively, maintain the outlet end of the draper belt in a horizontal planar condition at 59 (FIG. 2).

FIG. 3 illustrates a segment of the draper belt 42 and the manner in which its upper flight is positively engaged with the drive chains 28. For this purpose, each lift rod 34 is fixed to a non-rotatable chain attachment 60, and each end of each rod is provided with a non-rotatable drive collar 62 that is secured about the adjacent chain attachment. Projecting radially from each drive collar is a driving lug 64 which is so oriented, relative to the adjacent drive chain 28, that the driving lug is at top dead center when the lift rods on the upper flight of the drive chains are being elevated along the linear portions of their runs, as shown in FIG. 2. The draper belt 42 is formed of thin rods 66 having twisted and interlocked ends 68 which provide longitudinal flexibility and interspace the rods to permit supporting engagement by the driving lugs on the lift rods. Because the rods 66 may flex laterally, depending upon the width of the draper belt and the weight of the product to be supported, they may be interwoven with one or more flexible steel tapes (not shown) to resist such flexure.

In order to form conveying pockets P (FIG. 2) in the upper flight of the draper belt 42, the draper belt drive sprockets 50 at the inlet end of the elevator advance the draper belt faster than the drive chains 28 are advanced as previously pointed out. In the specific embodiment of the invention illustrated, the draper belt 42 is advanced 13 inches for every 9 inches of movement of the drive chains 28, and the lift rods 34 are spaced about 9 inches apart. Accordingly, as a lift rod 34 rises around the driven sprockets 30, the lift rod driving lugs 64 locate between two adjacent rods 66. As both the draper belt and drive chains continue to advacne from this position, the draper belt (as shown in FIGS. 5 and 6) continues to be fed at a faster rate and, beyond the inlet end 55 (FIG. 2), begins to droop between that lift rod (FIG. 6) and the draper belt drive sprockets 50. The over-all effect of the relative movement between the draper belt and the lift rods is to lower the draper belt from the FIG. 6 position to the position shown in FIG. 7 to form a pocket P around the lower hemisphere of a whole peeled grapefruit G. By the time the next lift rod 34 engages the draper belt, the fruit is securely entrapped within the pocket P without having been dropped and even without having had any appreciable relative movement with the draper belt.

Thus secured, the fruit is raised by the pocket toward the upper, discharge end of the elevator 10 (FIG. 8) at which point the leading lift rod 34 of a given pocket will travel over top dead center of the drive sprockets 26 and begin to descend. Meanwhile, the trailing lift rod 34 (FIG. 9) of the same pocket elevates relative to the leading lift rod so that the moving draper belt pocket changes contour but moves very little relative to the grapefruit because the tendency of the fruit to roll forward is offset by forward movement of the draper belt. Subsequently, the leading lift rod 34 disengages and drops away from the draper belt 42 while the draper belt continues to be advanced at the previously stated higher velocity relative to the drive chains. This causes the pocket to disappear, and the fruit is released from its previous confinement, without jarring, to travel with the draper chain over the jackshaft 18. At this point the fruit may roll onto a discharge chute 70 (FIG. 1) for delivery to the conveyor belt 14 or to another processing station.

It will be apparent that the speed differential between the draper belt 42 and drive chains 28 does not alter the profile of the draper chain during the lifting of the fruit, because, as one pocket P is being formed at the inlet end of the elevator 10, another pocket P is being removed at the outlet end of the elevator. In other words, a corresponding length of draper chain is payed out at the upper end of the elevator while the draper belt is slackened to form pockets at the lower end of the elevator.

It will be appreciated that the utility of the disclosed inclined conveying system is not limited to elevators and that the flight of conveying pockets can be arranged to follow a descending path for transferring a supply of fruit to a lower level. Thus, the system is adaptable to reverse operation to form what is known in the art as a "lowerator." A system of this type is diagrammatically illustrated in FIG. 4, wherein the components retain the same reference numerals as those of the similar components used in connection with the elevator 10 with the suffix *a* being added for clarification. In the modified conveying system 10a, a draper belt 42a and two drive chains 28a are provided with descending upper flights.

A motor M1 operates a chain and sprocket drive unit 20a (in a direction reverse to that of the motor M) for powering a jackshaft 18a which, in turn, provides driving power for the drive chains 28a and the draper belt 42a. In order to permit the reverse movement of the draper belt above mentioned, a hold down guide 71 is required at each side of the draper belt 42a to provide a planar, horizontally oriented inlet portion 73 which can be fed with whole peeled grapefruit. A further difference between the conveying system 10a and the conveying system 10 is that the lower flights of the drive chains 28a are tensioned when driven, thus requiring a spring-biased idler sprocket 72 for each drive chain so that the upper flights of the drive chains will retain the same configuration as that shown for the FIG. 1 elevator.

At the outlet end 74 of the lowerator 10a, the drive chains 28a are trained around driven sprockets 30a, thus applying power to a shaft 32a. By means of a chain and sprocket drive train 56a that is in driving engagement with one end of the shaft 32a, sprockets 50a, which are in engagement with the draper belt 42a, are driven at a faster linear speed than that of the sprockets 30a to cause the draper belt to advance faster than the drive chains 28a.

Sprockets 43a on the jackshaft 18a drive the upper portion of the draper belt 42a onto the sprockets 26a at the same velocity as the lower portion of the draper chain. Thus, in operation, a lift rod 34a at the upper end of the lowerator elevates into engagement with the draper belt 42a as it passes around the drive sprockets 26a, and the portion of the draper belt between that lift rod and the sprockets 43a is fed faster than the linear velocity of the lift rod to cause the draper belt to slacken and form a pocket. Because this lift rod will immediately elevate the section of draper chain with which it is engaged, to prevent roll-back of the grapefruit G it is necessary to support the planar inlet portion 73 of the belt as close as possible to the path of the lift rods and to provide sufficient slack in the draper belt. This assures that grapefruit will be delivered to a point past the upwardly moving lift rod when the draper belt starts to form a pocket.

Subsequent movement of the fruit is downward along the upper flight of the draper belt, with the fruit and belt having substantially no relative motion. As the draper belt travels under the curved guide rails 36a and moves into the horizontally oriented outlet section 74, the belt becomes less slack since the drive train 56a is pulling the belt at a linear velocity higher than the linear velocity of the lift rods 34a. The end result is that the conveying pockets, due to this linear velocity difference, flatten out and elevate the fruit onto the outlet section 74 without abrading or otherwise damaging the fruit because there is substantially no relative motion between the draper belt and the fruit while the pockets disappear. Thus, the sequence of operations of the lowerator 10a is similar to that shown in FIGS. 5–9 except that it takes place in a reverse order.

Both the lowerator 10a and the elevator 10 function according to the basic concept of the present invention of advancing the feed end of the draper belt 42a or 42 onto the lift rods 34a or 34 at a linear velocity exceeding that of the lift rods. By this means, the planar inlet portion of the draper belt is gradually formed into a pendant pocket around the articles supported thereon; following either lowering or elevating movement of the articles, the draper belt is pulled away from the lift rods at the same higher linear velocity to cause the draper belt to flatten out.

The operating mode is most easily visualized by assuming a static condition for the drive chains and draper belt with the upper flight of the draper belt looped over the lift rods to form the conveying pockets. Then, by moving the lift rods at one velocity, and by paying out and retrieving the draper belt at a higher velocity, the profile of the draper belt will not change as the pockets are elevated or lowered. The pockets will automatically appear and disappear to convey the fruit with the gentle handling advantages already noted.

Both the pocket forming and pocket removal functions are accomplished with substantially no relative movement between the supported articles and the draper belt. Accordingly, in view of this operating mode, the lowerator 10a and the elevator 10 provide improved and compact handling apparatus for transferring fragile articles such as whole peeled grapefruit between stations which have relatively large elevational differences.

It should be specifically noted that the inclination of the conveying flight of the draper belt can be greater or less than that shown in the drawings. Also, fragile articles other than whole peeled grapefruit or other fruit can obviously be elevated or lowered with the apparatus of the present invention without any substantial modifications to the apparatus.

Although the best modes contemplated for carrying out the present invention have been herein shown and described, it will be apparent that modification and variation may be made without departing from what is regarded to be the subject matter of the invention.

What is claimed is:

1. In an inclined conveyor for fragile articles, a pair of laterally spaced driven chains having inclined parallel flights, a spaced series of transverse rods interconnecting said driven chains, an endless flexible draper belt arranged in a path generally the same as that of said rods during said inclined flights of said driven chains, said draper belt being arranged to support fragile articles in pendent pockets formed by looping the draper belt over adjacent transverse rods, means for effecting engagement between said transverse rods and said draper belt in said path so that there is no relative motion between said belt and said rods, moving the upstream end of said draper belt just prior to its movement in said path at a higher linear velocity than that of said driven chains in order to continuously form said draper belt into a series of pendent pockets looped over adjacent rods, said rods thereby moving the thus formed draper belt pockets and the fragile articles supported thereby to a different elevation at the velocity of said driven chains.

2. In an inclined conveyor, a pair of laterally spaced endless chains having elongate inclined upper flights, means for driving said chains, a spaced series of transverse rods interconnecting said driven chains, an endless flexible draper belt circumscribing said rods for conveying fragile articles, said draper belt having an upper flight inlet portion guided along a generally horizontal path intersecting the path of said rods, means for effecting engagement between said transverse rods and said draper belt at the intersection of said paths so that there is no relative movement between said belt and said rods during subsequent simultaneous movement with said inclined upper flight of said chains, and drive means for advancing the inlet portion of said draper belt toward said intersection at a higher linear velocity than that of said driven chains, said belt drive means thereby being effective to cause said draper belt to engage one of said rods and form a pendant pocket hanging from that rod and the subsequent adjacent rod, said draper belt drive means being ineffective to drive that portion of said draper belt which is supported by said rods so that said rods convey the thus formed draper belt pocket and the fragile articles supported thereby to a different elevation at the linear velocity of said driven chains.

3. Apparatus according to claim 2 including a pair of sprockets engaged with the downstream end of said driven chains, means for driving the outlet portion of said draper belt at said higher linear velocity, said means for driving the outlet portion of the draper belt being located downstream of said sprockets whereby the leading one of said support rods of a given conveyor pocket will gradually move downward relative to the trailing support rod of that pocket to permit the pocket to flatten and continue the conveying movement of the articles supported thereby without any substantial relative movement between the articles and said draper belt.

4. Apparatus according to claim 2 wherein said means for driving said chains includes a pair of driven sprockets engaged with the upstream end of said driven chains for directing the lower flights of said chains upwardly toward said intersection with said draper belt, said draper belt drive means comprising a second pair of driven sprockets upstream of said driven sprockets of said chain drive means so that the section of draper belt forming a pocket gradually moves downward relative to the leading support rod of that pocket to form said pocket with substantially no relative movement between the supported fragile article and said draper belt.

5. In an inclined conveyor, a pair of laterally spaced endless chains having elongate inclined upper flights, means for driving said chains, a spaced series of transverse rods interconnecting said driven chains, an endless flexible draper belt circumscribing said rods for conveying fragile articles, said draper belt comprising a spaced series of transversely extending bars with interlocked ends, a radially projecting lug on each end of said rods, each lug being positioned so as to be engaged between an adjacent pair of bars of said draper belt to provide positive supporting engagement therewith, said draper belt having an upper flight inlet portion guided along a generally horizontal path intersecting the path of said rods, and drive means for advancing the inlet portion of said draper belt toward said intersection at a higher linear velocity than that of said driven chains, said belt drive means thereby being effective to cause said draper belt to engage one of said rods and form a pendant pocket hanging from that rod and the subsequent adjacent rod, said draper belt drive means being ineffective to drive that portion of said draper belt which is supported by said rods so that said rods convey the thus formed draper belt pocket and the fragile articles supported thereby to a different elevation at the linear velocity of said driven chains.

6. An inclined conveyor for fragile articles comprising a pair of laterally spaced endless chains having inclined upper flights, a spaced series of transverse support rods interconnecting and affixed to said chains, a flexible endless draper belt of narrower transverse dimensions than the interspacing of said chains, said belt forming a loop containing said support rods, means for engaging the draper belt on said transverse support rods, means for continuously driving said chains to elevationally transfer said support rods at one linear velocity in said inclined upper flights of said chains, and means for continuously driving said draper belt onto said support rods at a higher linear velocity to continuously form the upper flight of said draper belt into pendant pockets each pocket depending by the engaging means from two adjacent support rods, said support rods transferring the thus formed conveying pockets to a different elevation at the velocity of said claims.

7. Apparatus according to claim 6 wherein the upper flights of said chains and said draper belt are moved upwardly, said draper belt including a substantially horizontal inlet flight for supporting incoming articles, and means for guiding said support rods from the lower flight of said chains to the upper flight thereof, said draper belt drive means including drive means located intermediate said support rod guiding means and said inlet flight for advancing said draper belt onto said support rods.

8. Apparatus according to claim 7 wherein said draper belt includes a substantially horizontal outlet flight for supporting said articles after the removal of said pockets, and means adjacent said outlet flight for guiding said support rods from the upper flight of said chains to the lower flight thereof, said draper belt diverging from the path of said support rods to gradually flatten out each conveying pocket and continue the conveying movement of the articles on said outlet flight.

9. An inclined conveyor for handling relatively fragile articles comprising an endless flexible draper belt having an inclined conveying run, a supporting conveyor including a plurality of parallel spaced rods for supporting said draper belt during its inclined conveying run, means for effecting engagement between said draper belt and said parallel rods thereby permitting the parallel rods to support the draper belt during its inclined conveying run, means for continuously driving said supporting conveyor, and means for continuously driving the upstream end of said draper belt at a higher linear velocity than that of said rods whereby said draper belt is formed into pendant pockets between adjacent rods so that said fragile articles carried by said belt will be transferred to a different elevation with a minimum amount of relative movement between the articles and the belt.

10. An inclined conveyor as set forth in claim 9 including means for driving the downstream end of the belt at said higher linear velocity so as to cause said pockets to flatten out with a minimum amount of relative movement between the articles and the belt.

11. An inclined conveyor as set forth in claim 10 wherein said upstream and downstream ends of said draper belt extend in generally horizontal planes separated by said inclined conveying run of the belt.

12. An inclined conveyor as set forth in claim 11 wherein said draper belt and said supporting conveyor comprise endless conveyors with said supporting conveyor being enclosed within the endless loop path of the draper belt.

13. An inclined conveyor as set forth in claim 12 wherein said draper belt comprises a spaced series of transversely extending bars with perpendicularly bent and interlocked end portions.

14. An inclined conveyor for handling relatively fragile articles comprising a flexible draper belt having an inclined conveying run, said draper belt comprising a spaced series of transversely extending bars with perpendicularly bent and interlocked end portions, a supporting conveyor including a plurality of parallel spaced rods for supporting said draper belt during its inclined conveying run, each of said belt supporting rods including a radially projecting lug for engagement between a pair of adjacent bars of said draper belt, said draper belt and said supporting conveyor comprising endless conveyors with said supporting conveyor being enclosed within the endless loop path of the draper belt, means for continuously driving said supporting conveyor, means for continuously driving the upstream end of said draper belt at a higher linear velocity than that of said rods whereby said draper belt is formed into pendant pockets between adjacent rods so that said fragile articles carried by said belt will be transferred to a different elevation with a minimum amount of relative movement between the articles and the belt, and means for driving the downstream end of the draper belt at said higher linear velocity so as to cause said pockets to flatten out with a minimum amount of relative movement between the articles and the belt, said upstream and downstream ends of said draper belt extend in generally horizontal planes separated by said inclined conveying run of the belt.

* * * * *